Dec. 8, 1942.  P. E. QUENEAU ET AL  2,304,371
BEARING
Original Filed May 27, 1938
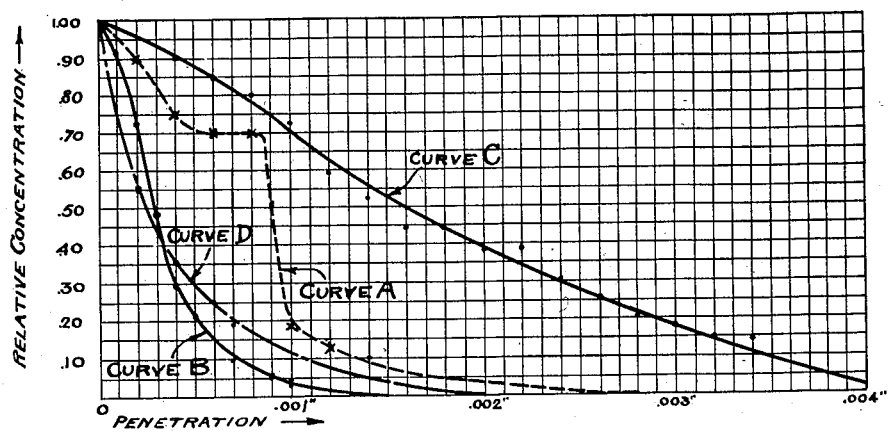
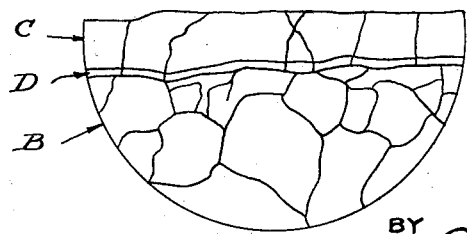
INVENTORS
Paul E. Queneau
Albert M. Hall
BY
ATTORNEY Patented Dec. 8, 1942

2,304,371

UNITED STATES PATENT OFFICE 2,304,371

BEARING

Paul Etienne Queneau, Copper Cliff, Ontario, Canada, and Albert Mangold Hall, Huntington, W. Va., assignors to The International Nickel Company, Inc., New York, N. Y., a corporation of Delaware Original application May 27, 1938, Serial No. 210,371. Divided and this application March 29, 1941, Serial No. 385,826

11 Claims. (Cl. 308—237)

The present invention relates to anti-friction bearings and to a method of making the same, and, more particularly, to anti-friction bearings made of a body of corrosion-resistant metal surface impregnated with cadmium which imparts or substantially improves the anti-friction or anti-galling properties of the metal, and to a method of impregnating the surface of the body with cadmium from the vapor state.

In many types of apparatus, equipment and machinery, bearings are required which must have high mechanical strength and/or great resistance to corrosion coupled with anti-friction or anti-galling properties. No available metal or alloy, so far as we are aware, has this desirable combination of properties, but we have discovered that satisfactory bearings may be made of a metallic body having the desired physical properties and/or the necessary resistance to corrosion but deficient in anti-friction or anti-galling properties by impregnating the surface with cadmium from the vapor state which imparts or substantially improves the anti-friction or anti-galling properties of the metallic body.

It is an object of the present invention to provide an improved anti-galling and anti-friction structure constituted of a metal or alloy so treated as to fulfill the multiple requirements of strength, hardness, resistance to heat and corrosion, and ability to operate under conditions of sliding and/or rolling friction without failure through galling or seizing.

It is another object of the invention to provide a process of making bearings comprising impregnating a body of metal or alloy possessing satisfactory strength, hardness and/or resistance to corrosion, but being deficient in anti-friction or anti-galling properties, with cadmium from the vapor state whereby satisfactory anti-galling properties are imparted to the body.

It is a further object of the present invention to provide a process of impregnating metals and alloys with cadmium to improve the resistance of the metals and alloys to the attack of corrosive agents.

It is also within the contemplation of the invention to provide a process of impregnating metals and alloys with cadmium from the vapor phase, in which an alloy is formed between the base metal or alloy and the cadmium.

Other objects and advantages of the invention will become apparent from the following description taken in conjunction with the accompanying drawing, in which—

Fig. 1 is a somewhat diagrammatic sectional elevational view of an apparatus for carrying out the process of the present invention;

Fig. 2 depicts a photomicrograph of a copper body impregnated with cadmium by the process embodying the present invention; and Fig. 3 depicts graphically the penetration of cadmium into representative base metals and alloys impregnated by the process of the present invention, as determined by spectrographic analyses.

Broadly stated the invention contemplates a bearing comprising a body or base of suitable metal or alloy such as copper, nickel, copper-nickel alloys, brass, steel, stainless steel, etc., impregnated at the surface with cadmium from the vapor state. The invention also contemplates a process of impregnating the surface of the base metal or alloy with cadmium under such conditions that the cadmium penetrates into the base to which it imparts anti-friction and anti-galling properties.

As those skilled in the art will readily understand, the selection of the base metal or alloy will be governed by the requirements of the particular application. For example, if high tensile strength is desired combined with lightness (low specific gravity), an aluminum alloy of the age hardening type is preferably selected, but if hardness, high strength and corrosion resistance are desired, an alloy of the stainless type, such as nickel-copper alloy, stainless steel and the like is preferably selected.

Generally speaking, the process embodying the present invention comprises preparing the surface of the metal or alloy to be impregnated to receive or imbibe cadmium from the vapor state, exposing the metal or article under properly correlated conditions of temperature and time to cadmium vapor in an atmosphere that is neutral or reducing with respect to the surface to be impregnated until the desired impregnation has taken place and then cooling the impregnated article. Under certain circumstances, it may be desirable to heat treat the impregnated article to improve the properties of the impregnated surface and/or modify the properties of the alloy of the base metal and the cadmium and/or control the depth of the case, i. e., the depth of the cadmium penetration, etc. This heat treatment may be performed in the cadmizing chamber or the impregnated pieces may be removed therefrom and heat treated in any suitable apparatus.

The nature of the preparation of the surface to receive or imbibe the cadmium will vary depending on the metal or alloy to be impregnated.

In general, the metals and alloys may be divided into two broad classes, viz., those which may be directly impregnated upon exposure thereof to cadmium vapors in a neutral or reducing atmosphere while in the solid state and at a temperature not in excess of the boiling point of cadmium, and those which may not be directly impregnated under these conditions.

In the case of metals and alloys which can be directly impregnated with cadmium under the aforesaid conditions, the preparation of the surface to be impregnated preferably comprises the removal of dirt, grease, etc., by any suitable means, for example by grinding, blasting, and the like, followed by a thorough pickling to remove any oxygen-containing material or other passive film that may have formed on the surface. Representative examples of such metals and alloys which have been successfully cadmized by the process embodying the present invention are nickel, copper, nickel-copper alloys, brass, bronze and nickel-chromium-iron alloys. These metals and alloys are characterized by their ability to alloy with cadmium.

In the case of metals and alloys which may not be directly impregnated with cadmium under the aforementioned conditions, the preparation of the surface to be impregnated preferably comprises cleaning and pickling in the manner already described, after which an intermediate layer of a bonding metal or alloy is deposited, for example by electroplating, spraying etc., upon the base metal. The bonding metal or alloy should be one which bonds well or alloys with the base metal when heated therewith after deposition and one which may be directly impregnated with cadmium from the vapor state under the conditions described hereinbefore. Representative examples of metals and alloys which have been successfully cadmized in accordance with the present invention after preparing the surfaces in this manner are aluminum plated with nickel or copper and steel plated with nickel. Aluminum and iron do not alloy readily with cadmium.

The cadmizing proper may be performed in any suitable gas filled container into which cadmium vapors may be introduced. An apparatus that has proved satisfactory in service is illustrated in Fig. 1, in which reference numeral 1 represents a cadmizing chamber comprising a bottom wall 2, side walls 3 and a removable cover 4. Within chamber 1 is a carbon pot 5 for holding and vaporizing the molten cadmium. A gasket 6 placed between the top 4 and walls 3 assures a gas-tight cadmizing chamber. A supply tube 7 communicates with the interior of the chamber 1 and connects it with a suitable source of gas to provide a neutral or reducing atmosphere within the cadmizing chamber 1. Air may be removed by "flushing" chamber 1 with neutral or reducing gas supplied through tube 7. An exhaust tube 8 is provided to carry off the air and gases. After the chamber 1 has been flushed to remove the air, the non-oxidizing atmosphere may be retained by maintaining neutral or reducing gas under pressure in chamber 1, or the non-oxidizing gas may be circulated through the chamber using a suitable filter to prevent outflow of cadmium vapor. It has been found advantageous to cover the molten cadmium in the pot with a blanket of powdered charcoal and ammonium chloride to assist in maintaining a reducing atmosphere and in preventing formation of passive areas on the article being cadmized. The blanket serves also to protect the cadmium against oxidation when the cover 4 is removed.

Any suitable gas may be used to provide the neutral or reducing atmosphere. Satisfactory results have been obtained using carbon monoxide and pure dry hydrogen.

The pieces of metal or alloy to be impregnated may be supported in the chamber 1 in any desired manner. Rod shaped articles 10, for example, may be supported on brackets 9 as illustrated in Fig. 1. The articles to be impregnated are maintained at a temperature not in excess of the boiling point of cadmium and preferably within the range of about 900° to about 1200° F. during the cadmizing treatment. In the apparatus illustrated in Fig. 1 the chamber 1, the pieces to be impregnated and the carbon pot may be heated from an external source of heat, for example by placing the apparatus in a muffle furnace. Any other suitable source of heat may be provided, as those skilled in the art will readily understand. It has been found that at a temperature of about 900° F. to about 1200° F. sufficient cadmium vapor is produced to yield satisfactory deposits. The time of exposure to cadmium vapors will depend upon the temperature, the thickness and structure of the case desired, etc. Satisfactory results have been obtained under the conditions mentioned hereinbefore in as short a time as about 30 minutes. No practical advantage appears to result from exposures longer than about 10 hours, and in most cases about 3 hours represents a practical maximum. It is not essential in all cases that the articles to be impregnated be preheated, as good penetration of cadmium may be obtained in some instances by passing hot cadmium vapors over unheated articles under suitable protective conditions.

For the purpose of giving those skilled in the art a better understanding of the process of the present invention the following illustrative examples are given.

*Example No. 1*

A copper bar was cleaned by grinding and then pickled in dilute nitric acid. Thereafter it was placed in a cadmizing chamber filled with pure dry hydrogen and exposed to cadmium vapors for about one hour at a temperature of about 1000° F. The cadmium bath was covered with powdered charcoal. The impregnated bar had a silver white, unspangled and finely crystalline case, the cadmium having penetrated about 0.001 inch uniformly into the surface.

Similar results were obtained when the temperature was about 900° F. and the time about 1.5 hours.

Fig. 2 represents a photomicrograph of the structure of a cross-section of the first mentioned test piece at a magnification of 500 diameters. Aqueous peroxide-ammonia was used to etch this specimen. It will be observed that three distinct zones or strata appear comprising the base metal B, an outer stratum C high in cadmium and an intermediate stratum D which also contains both cadmium and copper. This intermediate stratum D appears to be an intermetallic compound.

*Example No. 2*

A nickel bar was cleaned by rinsing in carbon tetrachloride and then pickled in dilute aqueous nitric acid. Thereafter it was exposed to cadmium vapor for about 3 hours at a temperature of about 1200 F. in an atmosphere of hydrogen.

The impregnated bar had a silver white surface into which cadmium had penetrated to a depth of about 0.0013 inch (microscopic measurement). Microscopic examination of the impregnated bar did not reveal a distinct layer comparable to D in Fig. 2. The cadmium apparently forms an alloy of the solid solution type with the nickel base and there is some evidence of intercrystalline penetration by cadmium, or by a high cadmium Cd—Ni constituent, into the grain boundary areas at the impregnated surface of the nickel base metal.

*Example No. 3*

A bar of nickel-copper alloy containing approximately 67% Ni, 30% Cu, 2% Fe and 1% Mn was pickled in dilute nitric acid. The cadmizing chamber was filled with pure dry hydrogen and the cadmium covered with a mixture of powdered charcoal and ammonium chloride. The bar was maintained at about 1100° F. for about 10 hours in contact with cadmium vapor. A uniform penetration to a depth of about 0.010 to 0.020 inch (microscopic measurement) had occurred on the surface of the bar.

A bar about 1" x 1" x 7" of nickel-copper alloy containing about 67% Ni, 30% Cu and 3.25% Al. treated under similar conditions for about 30 minutes at about 1100° F., was found to have a very even case of large, bright silver white spangles. A similar bar of the same alloy when treated at about 1000° F. for about 30 minutes had a smooth case on the top surface; a coarser and somewhat spangled case on the under surface while the side surface showed a gradation in structure from that of the bottom to that of the top. The case was bright and free from oxidation. A third specimen of about the same size was treated at about 900° F. for about 45 minutes. A very smooth and even surface impregnation occurred on all sides, the texture of the surface being finely granular.

It will be seen from the foregoing that the structure of the case produced by impregnating the surface of the base metal with cadmium can be modified by varying the temperature and the time of cadmizing. In general it may be said that the structure of the case becomes more coarsely crystalline and tends to become more spangled with increasing temperature.

*Example No. 4*

A bar of yellow brass containing about 67% Cu and about 33% Zn after being cleaned by grinding and pickled in dilute nitric acid was cadmized at about 1000° F. for about 1.5 hours under conditions similar to Example No. 2. The surface had much the same appearance as that applied to copper in Example No. 2, but was grayer in color. Microscopic examination revealed an intermediate layer comparable to D of Fig. 2, but somewhat thinner and less regular.

*Example No. 5*

A bar of nickel-chromium-iron alloy containing about 80% Ni, about 13% Cr and about 7% Fe was cleaned by grinding and pickled in warm nitric-hydrofluoric acids solution. It was then exposed to cadmium vapor for about 7 hours at a temperature of about 900° F. in an atmosphere of dry hydrogen. The surface was smooth, unspangled, finely crystalline and metallic gray in color. It has been found in practice that alloys of this type may be successfully impregnated at about 900° F. in about 3 to 7 hours.

*Example No. 6*

A bar of plain carbon steel of the S. A. E. 1020 type containing about 0.20% C was subjected to surface grinding and then dipped in carbon tetrachloride to remove any grease or the like. Thereafter it was electrolytically cleaned in trisodium phosphate. The cleaned bar was then placed in a nickel plating bath containing the following ingredients:

|  | Oz. per gal. |
|---|---|
| $NiSO_4.7H_2O$ | About 28.5 |
| $NiCl_2.6H_2O$ | About 6.0 |
| $H_3BO_3$ | About 4.0 |

The bath was maintained at a temperature of about 120° to 140° F. and at a pH value of about 5.3 to 5.5. A cathode current density of about 15 to 20 amperes per sq. foot was employed to deposit a layer of nickel on the steel bar. The nickel plated bar was then exposed to cadmium vapors in an atmosphere of dry hydrogen at a temperature of about 1150° F. for about 2 hours. The case was of the smooth, non-spangled, finely crystalline type.

Similar results were obtained when aluminum was carefully treated to remove all dirt and oxide from its surface, then coated with copper and exposed to cadmium vapors under conditions comparable to Example No. 2.

In order to determine more accurately the penetration of cadmium into the base metal and the nature of the penetration of the cadmium into the base metal, spectrographic penetration studies were made on the representative specimens. The studies were made by sparking the surface of the test piece and then polishing off a definite layer before sparking again.

The results of these determinations are shown graphically in Fig. 3 for the following specimens.

Copper cadmized for 1 hour at 1000° F.__ Curve A
Yellow brass cadmized for 1.5 hours at
 1000° F._____ Curve B
Nickel cadmized for 3 hours at 1200° F__ Curve C
NiCrFe cadmized for 7 hours at 900° F__ Curve D The concentration values, plotted on the ordinate axis, were obtained by assuming the cadmium concentration on the surface of the cadmized specimen to be unity.

The microscopic and spectrographic studies apparently demonstrate that in impregnating those metals and alloys which are directly cadmized by the process embodying the present invention, the cadmium penetrates into and forms an alloy with the base metal. This is clearly portrayed in Fig. 2 for cadmized copper, in which distinct outer, intermediate and inner strata may be seen. The intermediate stratum is believed to be a cadmium-copper intermetallic compound since the concentration-penetration curve A shows a horizontal portion at roughly the same concentration level indicating substantially constant cadmium content for a measurable depth. A similar stratum was observed under the microscope on polished sections of cadmized brass but it was less regular and thinner than in the case of copper which probably accounts for the absence of a similar horizontal portion in curve B of Fig. 3. In the cadmium impregnated nickel and nickel-chromium-iron alloy, the cadmium appears to form a solid solution type of alloy with the base metal. In all four curves, however, it is to be observed that the cadmium concentration decreases rapidly to zero from a maximum at the surface of the case inwardly, indicating that there is practically no pure cadmium on the surface of the cadmized articles but on the contrary that the impregnated case is essentially a solid solution or alloy of the cadmium in the base metal or alloy, the cadmium decreasing somewhat asymptotically from a maximum at the surface of the case to zero.

In those metals which cannot be directly cadmized, the intermediate bonding layer of metal deposited on the body during the pretreatment apparently alloys with the base metal by diffusion during the cadmizing treatment and at the same time the cadmium penetrates into and forms an alloy with the intermediate layer. It will be seen that the bearings produced by the process of the present invention are characterized by a tenacious alloy bond between the base metal and the anti-galling surface.

The anti-friction and anti-galling properties of the cadmized bearings of the present invention are very satisfactory. Metals and alloys which per se have very poor bearing properties but which would otherwise be desirable for bearings due to other valuable properties, e. g., strength, hardness, resistance to corrosion, etc., may be made into excellent bearings by the cadmizing process of the present invention. For example, when a piece of nickel-copper alloy about 15–16″ x ⅞″ x 2″ and containing about 67 Ni, 30 Cu and 3.25 Al was placed in a friction testing machine so that it reciprocated along another piece of the same metal about 36 times per minute under a load of about 1500 pounds, galling was produced in about 20 to 50 seconds whereas when one of the surfaces was cadmized no galling occurred after 3 hours, although some wear could be detected. In these tests the bearing surfaces were lubricated with castor oil.

Cadmized bearings of the present invention, in addition to vastly improved anti-friction properties, exhibit increased resistance to corrosion due to the protective action of the cadmium. This is of particular importance in those cases where the base metal used does not possess sufficient chemical stability to resist the corrosive agents to which it is exposed. Iron and low alloy steels, for example, are readily corroded in damp atmospheres, but when impregnated with cadmium they resist rusting and corrosion for long periods of time.

In the specification and claims the term "base metal" is used to designate metals or alloys of the types mentioned hereinbefore, i. e., iron, steel and their alloys; nickel and its alloys; copper, brass, bronze and other copper alloys; aluminum and its various alloys; etc.

This application is a division of our prior copending application Serial No. 210,371, filed May 27, 1938, now Patent No. 2,237,314, dated April 8, 1941.

Although the present invention has been described in connection with certain preferred embodiments, modifications and variations may be resorted to, as those skilled in the art will readily understand. Thus, the method of impregnating base metals with cadmium from the vapor phase, as described hereinbefore, may be utilized for purposes other than producing bearings, for example, to render metals and alloys such as iron and steel resistant to rusting and corrosive attack. Such modifications and variations are to be understood as coming within the purview of the invention as described in the specification and defined by the appended claims.

We claim:

1. An anti-friction and anti-galling bearing comprising a body of base metal adapted to sustain a load and subjected on its bearing surface to rubbing friction in use, the bearing surface of said body being impregnated with cadmium to form an integral case having anti-friction and anti-galling properties, the case possessing a cadmium concentration decreasing immediately from the surface of the case rapidly and somewhat asymptotically to zero, said case at its surface being substantially devoid of a layer of appreciable thickness of cadmium or cadmium-containing alloy of substantially constant cadmium concentration, and the case being capable of resisting failure or rupture from the base metal in use under rubbing friction by a shearing or other stressing action.

2. An anti-friction and anti-galling bearing comprising a body of base metal alloyable with cadimum adapted to sustain a load and subjected on its bearing surface to rubbing friction in use, the bearing surface of said body being impregnated with cadmium to form an integral case having anti-friction and anti-galling properties, the case possessing a cadmium concentration decreasing immediately from the surface of the case rapidly and somewhat asymptotically to zero, said case at its surface being substantially devoid of a layer of appreciable thickness of cadmium or cadmium-containing alloy of substantially constant cadmium concentration, and the case being capable of resisting failure or rupture from the base metal in use under rubbing friction by a shearing or other stressing action.

3. An anti-friction and anti-galling bearing comprising a body of base metal which does not alloy readily with cadmium, a layer of a base metal alloyable with cadmium alloy bonded to said body of base metal, said layer as reinforced by said body being adapted to sustain a load and subjected to rubbing friction in use, said layer being impregnated with cadmium to form an integral case having anti-friction and anti-galling properties, the case possessing a cadmium concentration decreasing immediately from the surface of the case rapidly and somewhat asymptotically to zero, said case at its surface being substantially devoid of a layer of appreciable thickness of cadmium or cadmium-containing alloy of substantially constant cadmium concentration, and the said case being capable of resisting failure in use under rubbing friction by a shearing or other stressing action.

4. An anti-friction and anti-galling bearing comprising a body selected from the group consisting of copper and copper alloys adapted to sustain a load and subjected on its bearing surface to rubbing friction in use, the bearing surface of said alloy being impregnated with cadmium to form an integral case having anti-friction and anti-galling properties, the case possessing a cadmium concentration decreasing immediately from the surface of the case rapidly and somewhat asymptotically to zero and being substantially devoid of a surface layer of appreciable thickness of cadmium or cadmium-containing alloy of substantially constant cadmium concentration.

5. An anti-friction and anti-galling bearing comprising a body selected from the group consisting of nickel and nickel alloys adapted to sustain a load and subjected on its bearing surface of said body being impregnated with cadmium to form an integral case, the crystal structure of which is continuous with the base metal, the case possessing a cadmium concentration decreasing immediately from the surface of the case rapidly and somewhat asymptotically to zero and being substantially devoid of a surface layer of appreciable thickness of cadmium or cadmium-containing alloy of substantially constant cadmium concentration.

6. An anti-friction and anti-galling bearing comprising a body of steel being alloy bonded to a layer of nickel, said layer as reinforced by said body being adapted to sustain a load and subjected to rubbing friction in use, said layer being impregnated with cadmium to form an integral case having anti-friction and anti-galling properties, the case possessing a cadmium concentration decreasing immediately from the surface of the case rapidly and somewhat asymptotically to zero and being substantially devoid of a surface layer of appreciable thickness of cadmium or cadmium-containing alloy of substantially constant cadmium concentration.

7. As a new article of manufacture, a body of base metal comprising a surface impregnated with cadmium forming an integral case having a cadmium concentration decreasing immediately from the surface rapidly and somewhat asymptotically to zero and being substantially devoid of a surface layer of appreciable thickness of cadmium or cadmium-containing alloy of substantially constant cadmium concentration.

8. A composite corrosion resistant article of manufacture comprising a steel body, a layer of nickel alloy bonded by diffusion with said body, and cadmium impregnating the exposed surface of said nickel layer, there being no surface layer of appreciable thickness of cadmium or cadmium-containing alloy of substantially constant cadmium concentration.

9. A composite corrosion resistant article of manufacture comprising a base metal foundation, a layer of nickel on said foundation, and cadmium impregnating the exposed surface of said nickel layer, there being no surface layer of appreciable thickness of cadmium or cadmium-containing alloy of substantially constant cadmium concentration.

10. A composite corrosion resistant article of manufacture comprising a base metal foundation, a layer of protective metal selected from the group consisting of nickel and copper on said foundation, and cadmium impregnating the exposed surface of said protective metal layer, there being no surface layer of appreciable thickness of cadmium or cadmium-containing alloy of substantially constant cadmium concentration.

11. A composite corrosion resistant article of manufacture comprising a base metal foundation, a layer of protective metal selected from the group consisting of nickel and copper alloy bonded by diffusion with said base metal foundation, and cadmium impregnating the exposed surface of said protective metal layer and forming an integral case having a cadmium concentration decreasing immediately from the surface rapidly and somewhat asymptotically to zero, said case at its surface being substantially devoid of a layer of appreciable thickness of cadmium or cadmium-containing alloy of substantially constant cadmium concentration.

PAUL ETIENNE QUENEAU.
ALBERT MANGOLD HALL.